United States Patent [19]
Scott

[11] Patent Number: 5,186,419
[45] Date of Patent: Feb. 16, 1993

[54] SPACE TRANSFER VEHICLE AND INTEGRATED GUIDANCE LAUNCH SYSTEM

[76] Inventor: David R. Scott, 1300-B Manhattan Ave., Manhattan Beach, Calif. 90266

[21] Appl. No.: 472,395

[22] Filed: Jan. 30, 1990

[51] Int. Cl.$^5$ .............................................. B64G 1/00
[52] U.S. Cl. ................................. 244/158 R; 244/164; 244/172
[58] Field of Search .................. 244/158 R, 164, 172

[56] References Cited

U.S. PATENT DOCUMENTS

| | | | |
|---|---|---|---|
| 4,664,343 | 5/1987 | Lofts et al. | 244/158 R |
| 4,723,736 | 2/1988 | Rider | 244/158 R |
| 4,880,185 | 11/1989 | Apfel | 244/172 |
| 4,884,770 | 12/1989 | Martin | 244/158 R |
| 4,896,848 | 1/1990 | Ballard et al. | 244/158 R |
| 4,964,340 | 10/1990 | Daniels et al. | 244/172 |

*Primary Examiner*—Joseph F. Peters, Jr.
*Assistant Examiner*—Anne E. Bidwell

[57] ABSTRACT

A space launch system and a space transfer vehicle useable within such system. The space transfer vehicle includes a primary propulsion engine and attitude control system powered by the same storable bipropellant fuel and a guidance system for both the atmospheric launch vehicle and the space transfer vehicle. The space transfer vehicle is fuelable in space and has a primary propulsion engine which is configured for variable thrust burns.

3 Claims, 4 Drawing Sheets

SPACE TRANSFER VEHICLE AND INTEGRATED GUIDANCE LAUNCH SYSTEM

This invention relates to an integrated guidance launch system for delivering payloads from earth to destinations orbits or trajectories in space and to a space transfer vehicle especially adapted for use in such a system.

More particularly, the invention concerns a space transfer vehicle which is compatible with a wide variety of launch vehicles and which is highly adaptable to space transportation of a variety of payloads.

In another respect, the invention pertains to a space transfer vehicle which is adaptable to a wide variety of mission scenarios.

The design of a space transportation system is based on the optimization of a complete mission to deliver payloads to destination orbits or trajectories, which are often high above the level of the earth's atmosphere. To complete such a mission, a "launch system" is required which can transport a payload through each of two distinct flight phases, each having different physical conditions. These conditions are imposed and control the design and operation of two different classes of propulsion vehicles, each of which traverses one of these phases in sequence.

The first phase consists of the transport from the surface of the earth, through the atmosphere, and into "space", or "low earth orbit" (LEO), normally selected at 100 to 200 miles above the earth. Space is defined as any location above the sensible atmosphere, which can be considered to effectively end approximately 80 miles above the surface of the earth.

The second phase consists of the transport within space, e.g., from LEO to some significantly higher destination, trajectory or operational orbit such as the elliptical geosynchronous transfer orbit (GTO) or the circular geostationary earth orbit (GEO).

The physical characteristics and operational requirements of these two phases are entirely different. In the first or ascent phase, traverse through the dense, often turbulent, and moisture-laden layers of the atmosphere is performed by the continuous rocket thrust of a complex "atmospheric launch vehicle" which must constantly change its flight path to compensate for gravity effects. In contrast, during the second phase, transfer through the relatively benign environment of space is performed by one or more short bursts of energy from the rockets of a "space transfer vehicle". These maneuvers (or "burns") are separated by relatively long periods of unpowered, or coasting, flight.

The atmospheric launch vehicle (ALV) is therefore subjected to many highly variable forces in contrast to the relatively passive domain encountered by the space transfer vehicle. The ALV must be constructed to withstand dynamic atmospheric effects such as wind, rain, turbulence, ice, shear and lightning, and the pressure and thermal effects of atmospheric drag. During the ascent phase, the ALV cargo is protected from aerodynamic friction by a fairing, or shroud, enclosing a cargo bay or compartment of the ALV. Once in space, the protective shroud is removed, and the space transfer vehicle and its payload are extracted or propelled from the payload or cargo, bay of the ALV.

The space transfer vehicle (STV) is only subjected to relatively static conditions of space such as radiation from the sun and minute particulate matter. Thus, the STV operates in the near void of space with far fewer systems requirements and interactions than the atmospheric launch vehicle therefore the STV is "space-configured", i.e., designed to operate only in space, omitting the type of components necessary to protect the vehicle from dynamic, pressure and thermal effects of atmospheric opertion. Nevertheless, a relatively minor improvement in the STV when integrated into the total launch "system" can result in moliminous improvement of the entire launch system.

Current ALVs consist of two or three "stages", each of which is dropped during the ascent phase of the launch sequence when its propellant is expended, thus reducing the dead weight of the vehicle. These stages may be mounted in tandem or "strapped-on" the outside of the core first stage. Most ALVs presently used commercially are either duplicates or derivatives of Intercontinental Ballistic Missiles (ICBMs) developed during the 50's and 60's which were designed to deliver a payload to a ballistic space trajectory or to a low earth orbit.

Space transfer vehicles are required on all ALVs to delivery payloads to orbits higher than low earth orbit. Such transfer vehicles can carry more than one payload, or they can be combined in tandem (two stages) to deliver larger payloads, again taking advantage of disposal of the dead weight of the first stage when its propellant is expended.

Atmospheric launch vehicles are often designed to include their own, or indigenous, space transfer vehicle, often designated an "upper stage." The European Ariane 4 is typical of this class of ALVs, having an upper stage to deliver payloads to GTO. Since neither the Shuttle nor the Titan family of expendable launch vehicles (ELVs) have indigenous upper stages, a number upper stages for these atmospheric launch vehicles are known in the art. Once-such upper stage, which is particularly versatile, reliable and cost effective, is the "Satellite Transfer Vehicle" which is disclosed in co-pending application for United States patent, Ser. No. 865,731, now U.S. Pat. No. 4,896,848, [which is derived from International Application PCT/US85/01648, filed Aug. 28, 1985] which is, in turn, a continuation-in-part of U.S. application, Ser. No. 645,911, filed Aug. 29, 1984, now U.S. Pat. No. 4,664,343, issued May 12, 1987.

The general architecture of present commercial launch systems consists of launch and transfer vehicles equipped with either liquid rocket engines or solid propellant rocket motors, or combinations of both.

Propulsion systems using liquid fuel engines contain three primary elements, a fuel tank, an oxidizer tank, and the rocket thruster. Fuel and oxidizer are forced into the chamber of the thruster by tank pressure or turbo pumps where they ignite and are expelled through the rocket nozzle producing thrust.

A solid propellant is a rubbery compound in which the fuel, oxidizer and a binding agent are baked together and cast on the inside wall of a chamber or casing of the solid propellant motor. The propellant is cast such that a contoured open core results which provides the burning surface from which gases are expelled through a rocket nozzle. Whereas liquid engines can be stopped and restarted in flight, solid propellant motors burn continuously until all the propellant is consumed.

The original form of the Satellite Transfer Vehicle was based on a NASA requirement for an intermediate class upper stage for the Space Transportation System (STS) or "Space Shuttle". Subsequent studies validated this basic design as generally useful as an upper stage for other ALVs, including the unmanned expendable atmospheric launch vehicles EALVs, e.g., the USA Titan II and the Chinese Long March 2E.

Proposed new space missions and new scenarios for current missions have now demonstrated the need for improved near-term launch systems for both government and commercial orbital payloads with increased versatility, reduced on-orbit costs and improved reliability.

Accordingly, the principal object of the present invention is to provide an improved space transfer vehicle, specially adapted for use in combination with EALVs in an improved launch system for delivering payloads from earth to destination orbits or trajectories in space.

Another object of the invention is to provide such a space transfer vehicle of improved reliability and versatility and which will provide for delivery of payloads from low earth orbit with improved versatility, cost and reliability.

Yet another object of the invention is to provide an improved launch system using existing ALVs in a new combination with both existing upper stage vehicles or the improved space transfer vehicle disclosed herein.

These and other, further and more specific objects and advantages of the invention, will be apparent to those skilled in the art from the following detailed description thereof, taken in conjunction with the drawings, in which.

Briefly, in accordance with the invention, I provide a space transfer vehicle adapted to be carried into space by an expendable atmospheric launch vehicle where it is useful for transporting a payload from a first space trajectory to a second space trajectory. The improved STV includes a primary propulsion engine powered by liquid fuel, an attitude control system powered by the same fuel, a system for supplying the fuel to both the primary propulsion engine and the attitude control system, and a guidance system for generating guidance signals for both the STV and ALV.

In accordance with a further aspect of the invention, I provide a launch system comprising an EALV, STV and guidance system integral with the STV for both the ALV and the STV. In the preferred embodiment of this system the STV also includes a primary propulsion engine and attitude control system powered by the same storable bipropellant fuel.

According to further preferred embodiments of the invention the STV is fuelable and re-fuelable in space and the primary propulsion engine of the STV is configured for variable thrust burns.

Figure 1:
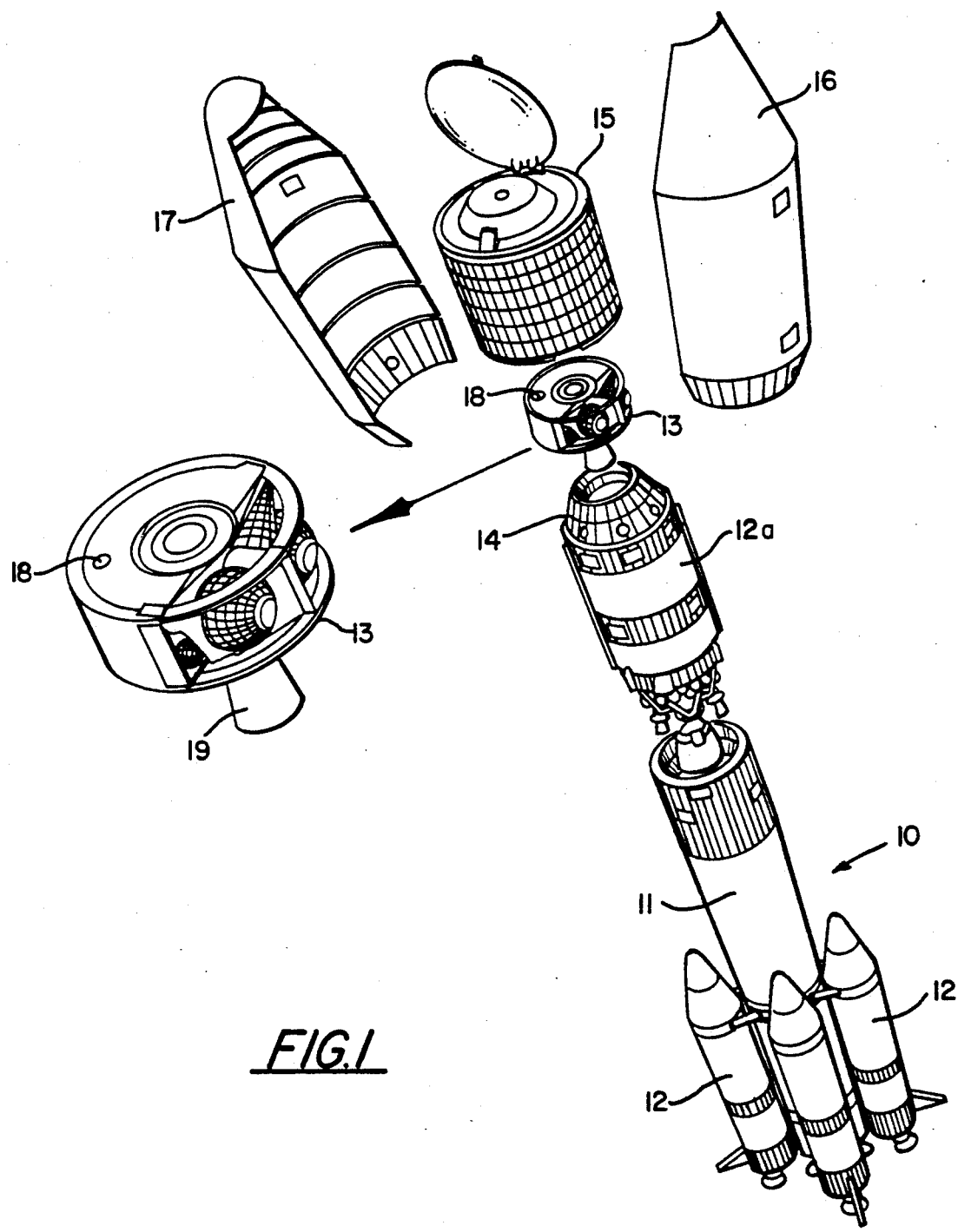
FIG. 1 is a partially exploded perspective view of an improved launch system embodying the preferred embodiment of the invention chosen for purposes of illustration and not by way of limitation of the scope thereof.

Turning now to the drawings, which depict embodiments of the invention which are chosen for the purpose of illustration and not by way of limitation on the scope of the invention, FIG. 1 depicts an integrated guidance launch system including an atmospheric launch vehicle 10 consisting of a airframe housing the first stage main engine 11 and strap-on booster engines 12. The EALV is provided with a second stage airframe and engine 12a which carries a space transfer vehicle 13 on a payload adapter 14. The payload 15 is releasably mounted and carried on the STV 13. The adapter 14, STV 13 and payload 15 are enclosed during earth launch and ascent into space in a cargo bay enclosure formed by jetisonable shroud members 16 and 17. The manner of releasably interconnecting and deploying the elements of the launch system of FIG. 1 and standard methods, well known in the art, the details of which are omitted for clarity.

According to presently preferred embodiment, the STV is provided with a suitable external fueling and re-fueling port 18 to permit the STV to be fueled and re-fueled in space. Such re-fueling could, for example, be accomplished by the STS or at the Space Station.

According to further preferred embodiment, the primary propulsion engine 19 of the STV 13 is configured by art-recognized techniques for multiple starts and variable thrust burns and the attitude control system procedures are sized to effectively maintain attitude, perform main engine back-up maneuvers and perform rendezvous, mid course and braking maneuvers. The STV carries the guidance system for both the ALV 10 and the STV 13. With the capability for in-space fueling and re-fueling the STV is re-usable which allows it to perform transfer maneuvers for plurality of payloads which are carried in to space by other ALVs. When provided with appropriate avionics for remote control and on board TV cameras, the STV can perform a wide variety of rendezvous and docking maneuvers as, for example, illustrated in FIGS. 3 and 4.

By providing an integral guidance system located in the STV 13 for both the EALV 10 and the STV 13, the EALV 10 can be constructed with a minimum of components, with the weight savings contributing to the overall efficiency of the launch system. Using updated guidance technology, this integrated guidance capability is especially suited for launch systems employing existing large booster EALV such as the Titan II and Long March 2E ELVs.

Figure 2:
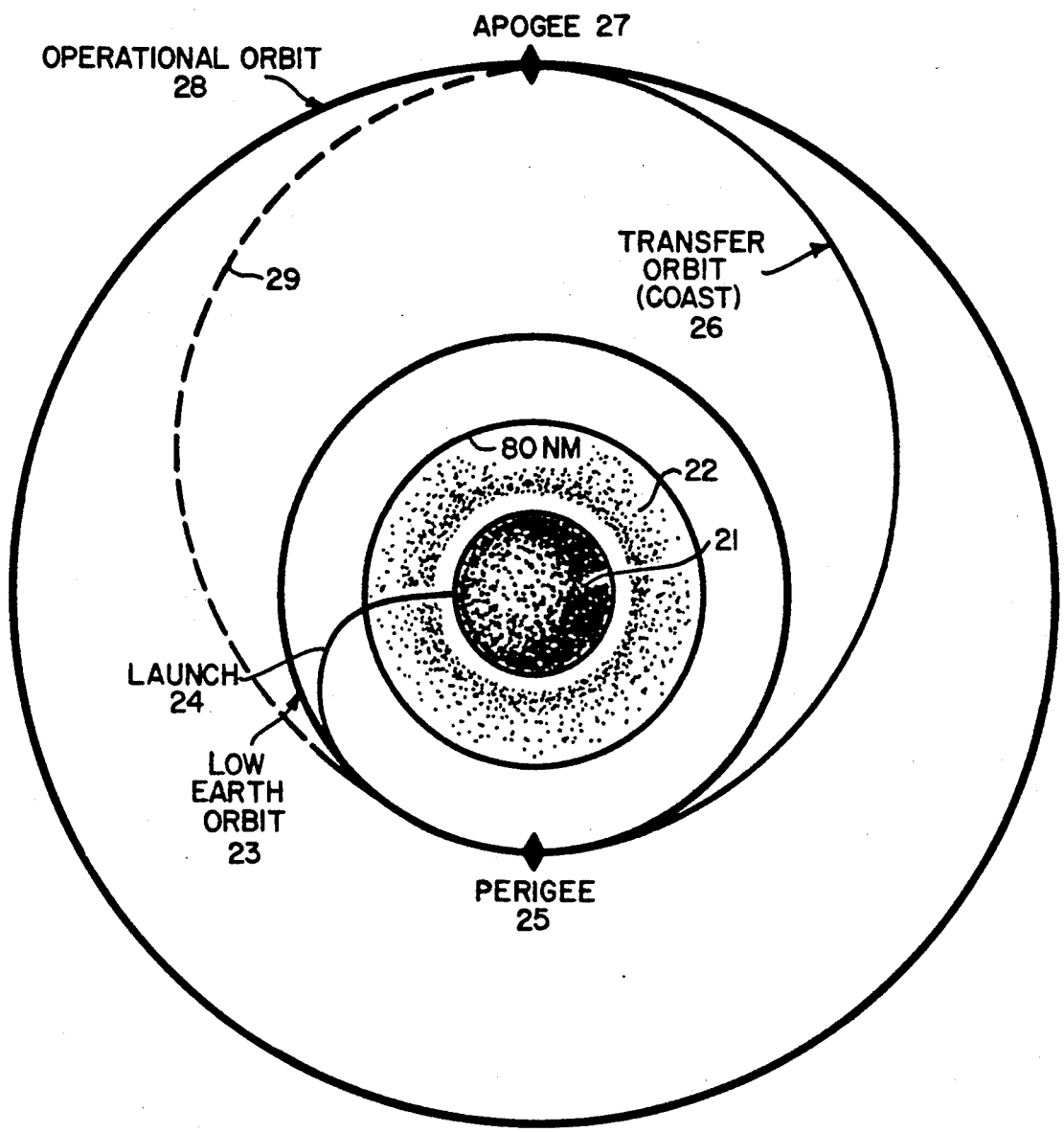
FIG. 2 illustrates a typical mission scenario for the launch system of FIG. 1, in which a payload is carried by the EALV into Low Earth Orbit (LEO) and thereafter transferred by the space transfer vehicle to operational orbit (GEO)

FIG. 2 depicts one typical mission scenario for the launch system of FIG. 1 in which the integrated guidance launch system (IGLS) is used to deploy payload such as a communication satellite from earth 21 through the sensible atmosphere 22 into low earth orbit 23, e.g., 100 nautical miles, (nm) above the earth 21. During the launch phase 24, the combinations of FIG. 1 are in a assembled relationship, with propulsion provided by the EALV 10 and guidance by the guidance system contained within the STV 13. Upon achieving LEO 23, the STV-payload combination 13-15 is separated from the second stage 12 of the EALV. When the STV-payload combination is at perigee 25, one or more perigee burns of the STV primary propulsion engine 19, places the combination in to a coasting transfer orbit 26. At perigee 27, one or more further STV propulsion engine burns are accomplished to place the STV-payload combination into operational orbit 28, e.g. at 250-22,300 nm GEO. In this orbit, separation of the STV 13 and payload 15 are accomplished and the STV can then be returned as indicated by the dashed line 29, to LEO 23 for re-fueling and accomplishment of additional payload rendezvous docking and transfer maneuvers.

Figure 3:
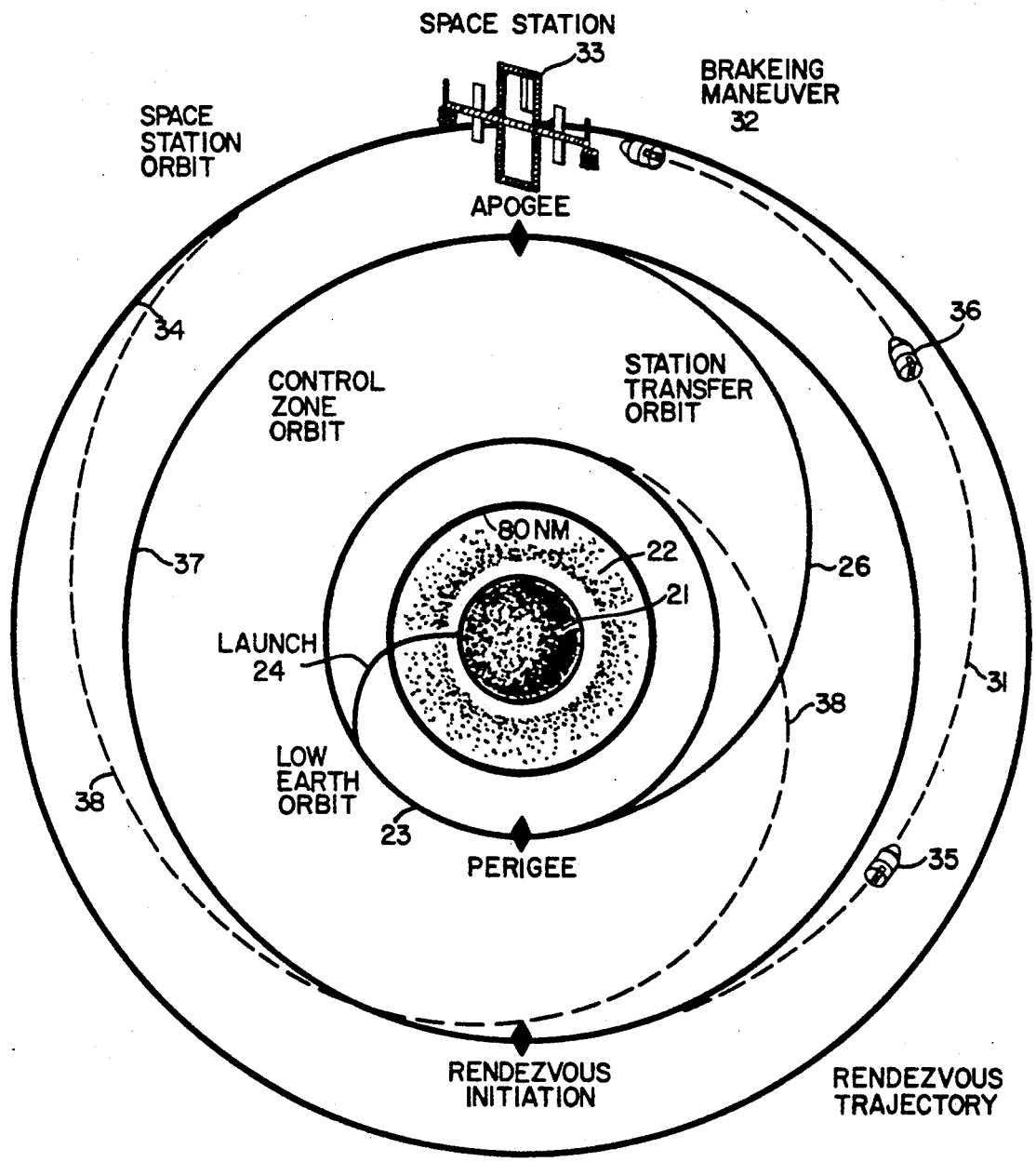
FIGS. 3 and 4 illustrate another mission scenario in which the launch system of the invention is used to provide logistical support for the proposed orbiting Space Station, utilizing special capabilities of the space transfer vehicle of the invention.
Figure 4:
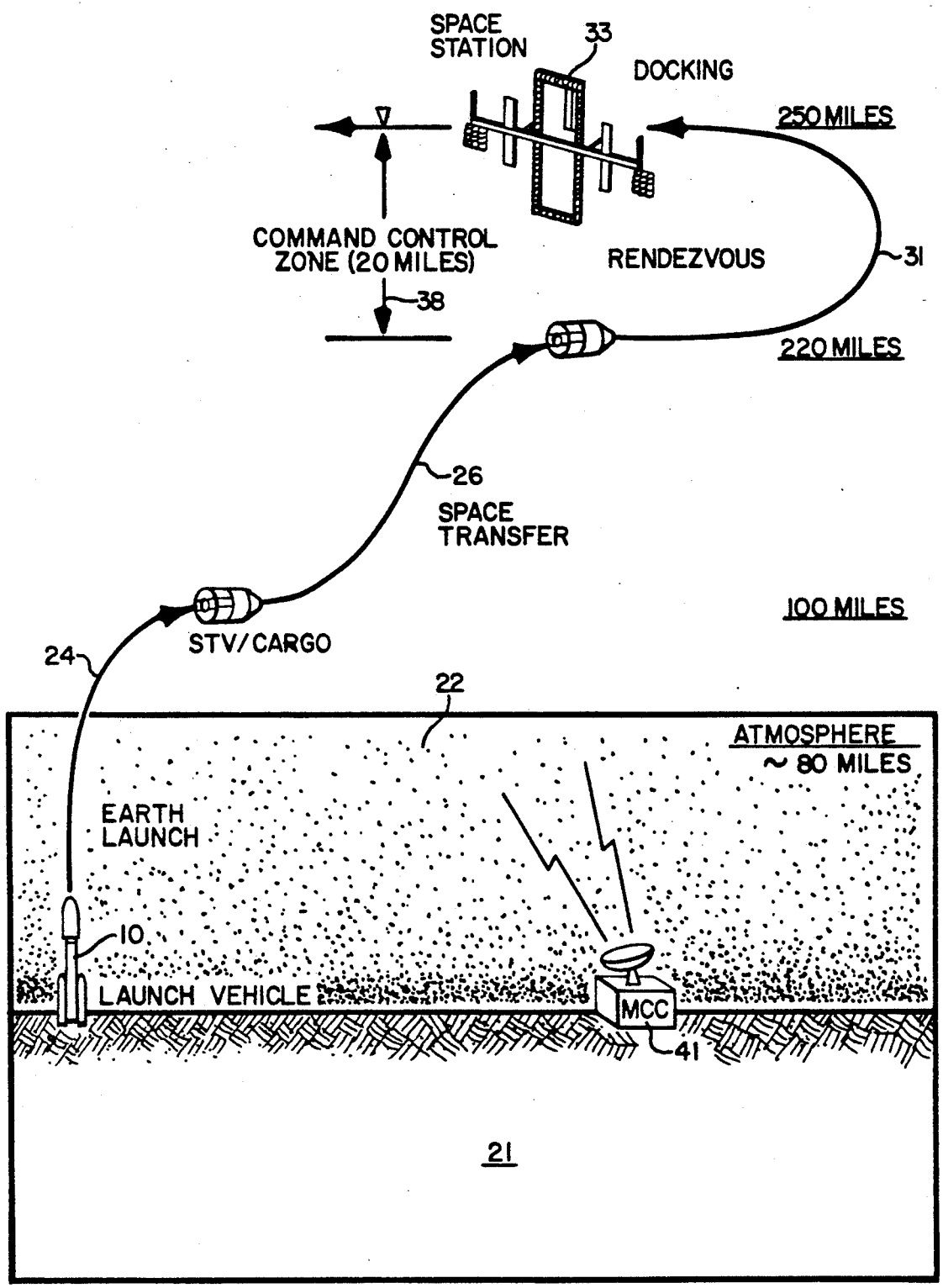

As depicted in FIGS. 3-4, the IGLS is especially suitable to provide logistics for the planned Space Station. According to this mission scenario the STV is carried in to LEO 23 by the launch 24 of the IGLS system as illustrated in FIG. 1, as already described in FIG. 2, the STV-cargo combination then traverses the space transfer orbit 26 into a control zone orbit 37. For example, this control zone 38 can be within 20 miles of the Space Station 33. From the control zone orbit 37, the STV-cargo combination then enters a rendezvous trajectory 31 which may include mid course corrections 35 and 36 and a braking maneuver 32 to bring it within range of the Space Station 33, at which point it can then execute docking at the Station docking port or can be recovered by equipment associated with the Station. After discharge of the cargo, the STV can return via orbit 38 to LEO 23 for re-fueling and re-use to transfer additional cargoes or for recovery and return to earth 21 by means of the STS. Space Station STS rendezvous and docking can be enhanced by navigation and guidance by a ground station 41. According to this procedure the STV functions not only as a carrier of the cargo but actively performs operational guidance course correction, braking and docking maneuvers to deliver the cargo to the Space Station, a radical departure from the presently planned procedure in which the orbital maneuvering vehicle (OMV), berthed at the Station retrieves passive cargo delivered within the manned control zone by a conventional EALV upper stage or by the STS. According to this "STV-Active" procedure, the Space Station operations are simplified, there is no need for the cargo retrieval function of the OMV and the overall cost of delivery is substantially reduced.

Having described by invention in such terms as to enable those skilled in the art to understand and practice it, and having described the presently preferred embodiments thereof, I claim:

1. An integrated guidance launch system for delivering a payload from earth to a space destination, comprising:
   (A) an expendable atmospheric launch vehicle, constructed to withstand dynamic atmospheric effects and the pressure and thermal effects of atmospheric drag, said launch vehicle including protective shroud means defining an enclosed cargo bay; and
   (B) a space-configured transfer vehicle, carried in said enclosed cargo bay of said launch vehicle, for transporting a payload from an intermediate space trajectory to a space destination, said transfer vehicle including
      (i) primary propulsion engine means powered by liquid fuel,
      (ii) attitude control system means powered by liquid fuel,
      (iii) fuel supply means for supplying liquid fuel to both said primary propulsion engine and said attitude control system, and
      (iv) guidance means for said launch system, integral with said transfer vehicle, including means for
         (a) generating guidance signals for said transfer vehicle, and
         (b) generating guidance signals for said launch vehicle.

2. The launch system of claim 1, in which said transfer vehicle further includes means for fueling and re-fueling said transfer vehicle in space.

3. The launch system of claim 1, in which said transfer vehicle primary propulsion engine is configured for variable thrust burns.

* * * * *